(12) United States Patent
Lewis

(10) Patent No.: US 7,467,638 B2
(45) Date of Patent: Dec. 23, 2008

(54) METHOD AND APPARATUS FOR WASHING FRUIT AND VEGETABLES

(75) Inventor: David K. Lewis, Salinas, CA (US)

(73) Assignee: Fresh Express, Inc., Salinas, CA (US)

( * ) Notice: Subject to any disclaimer, the term of this patent is extended or adjusted under 35 U.S.C. 154(b) by 0 days.

(21) Appl. No.: 11/181,960

(22) Filed: Jul. 15, 2005

(65) Prior Publication Data

US 2006/0127551 A1 Jun. 15, 2006

Related U.S. Application Data

(60) Provisional application No. 60/588,817, filed on Jul. 15, 2004.

(51) Int. Cl.
*B08B 3/00* (2006.01)
(52) U.S. Cl. ............... 134/124; 134/100.1; 134/103.2; 134/104.1; 134/122 R; 134/125; 134/126; 134/133; 134/134
(58) Field of Classification Search ............... 134/129, 134/130, 131, 133, 198, 100.1, 103.2, 104.1, 134/122 R, 124, 125, 126, 134
See application file for complete search history.

(56) References Cited

U.S. PATENT DOCUMENTS

| | | | | |
|---|---|---|---|---|
| 2,114,537 A | * | 4/1938 | Lewis | ............... 134/73 |
| 4,542,687 A | * | 9/1985 | Johnson | ............... 99/639 |
| 4,844,106 A | * | 7/1989 | Hunter et al. | ............... 134/73 |
| 5,331,702 A | * | 7/1994 | Willsey et al. | ............... 15/21.2 |
| 5,413,131 A | * | 5/1995 | Medlock | ............... 134/104.4 |
| 5,778,907 A | | 7/1998 | Ransley, Jr. et al. | |
| 6,349,730 B1 | | 2/2002 | Goto | |
| 6,626,192 B2 | * | 9/2003 | Garcia et al. | ............... 134/25.3 |
| 6,821,353 B1 | * | 11/2004 | Kuhl | ............... 134/6 |
| 2001/0047814 A1 | * | 12/2001 | Nwoko et al. | ............... 134/25.3 |
| 2005/0087214 A1 | * | 4/2005 | Ransley et al. | ............... 134/25.1 |

\* cited by examiner

*Primary Examiner*—Michael Barr
*Assistant Examiner*—Rita R Patel
(74) *Attorney, Agent, or Firm*—Townsend and Townsend and Crew LLP

(57) ABSTRACT

One embodiment of the present invention includes an apparatus for washing a product with a fluid. The tank may receive a plurality of product, such as fruits and vegetables, into the fluid and be configured to receive a moving conveyor, having a first end, a second end, a first section, and a second section. The conveyor may have a plurality of protruding panels being structured and arranged on the conveyor to push the product through the fluid in the tank and to lift the product from the fluid in the tank to the second end of the conveyor. At least one first nozzle may be positioned substantially above the conveyor and configured to deliver the fluid onto the product as the product is pushed by the plurality of panels. The fluid delivered from the at least one first nozzle may rotate the product in the fluid in the tank.

8 Claims, 4 Drawing Sheets

METHOD AND APPARATUS FOR WASHING FRUIT AND VEGETABLES

This application claims priority from U.S. provisional patent application Ser. No. 60/588,817, filed Jul. 15, 2004, entitled "FRUIT AND VEGETABLE WASHER," the disclosure of which is incorporated herein, in its entirety, by reference.

FIELD OF THE INVENTION

The present invention relates to preparing fruits and vegetables after harvesting and, more particularly, to method and apparatus for washing fruits and vegetables.

BACKGROUND OF THE INVENTION

Prior to consuming or processing fruits and vegetables a thorough washing is required to remove dust, pesticides, and biological contamination from the surface of the product. Bacteria that is not removed or destroyed may not only cause spoilage of the fruit or vegetable, but may also cause serious illness. Dangerous pathogens, such as *Salmonella, E. coli,* and *Listeria*, occur commonly in nature and under the right circumstances can make there way through the commercial food chain to the consumer.

Attempting to clean the fruit or vegetable by removing the products peel has been shown to be unsuccessful in eliminating the problem. Peeling knives can transmit contaminants from the surface of the skin to cells that become exposed when the peel is removed. Blanching and pasteurization processes used in the freezing, canning, and dehydrating industries do kill pathogens and thus minimize the food safety risk. However, these processes include thermal processing, which degrades texture, flavor, and nutritional value. As a result blanching and pasteurization processes fail as a suitable cleaning method when natural tasting, high quality fruits and vegetables are desired.

Often, fruits and vegetables are submerged in a cleaning solution in order to kill pathogens and remove dirt and other contaminants. Unfortunately, fruit and vegetables that float, such as apples, peaches, plums, and peppers, create difficulties during washing. The area most subject to contamination is the depression on top of the fruit where the stem connects because the fruit is oriented upwards when hanging on the tree forming a pocket that collects dust and harbors bacteria. Certain fruit, such as apples, tend to float stem up, making the depression on the top of the fruit difficult to clean without special and costly attention.

Traditionally, brush washers and flume washers are commonly used to clean produce yet both fail to adequately clean the dirtiest area of the fruit. Brush washers typically employ rotating bristles to scrub the surface of the fruit or vegetable. Unfortunately, the rotating bristles fail to penetrate into recesses, thus leaving the dirtiest area of the fruit or vegetable, such as the depression on an apple, untouched.

While flume washers attempt to immerse the fruit or vegetables, many floating fruits fail to be cleaned adequately. Bins of produce may be dumped into flumes and hydraulically conveyed to other processing equipment, such as sorters or peelers. Immersion of the product, typically occurring only when the fruit and vegetable is initially dumped into the flume, often serves as the only washing step prior to processing. Many fruits, such as apples, and vegetables float with their stem oriented upwards, out of the water. As a result of the limited and random contact with water, the flume washers also fail to adequately clean the dirtiest part of the fruit or vegetable.

To enhance the cleaning process, water sprays have been added to brush and/or flume washers. However, speed of travel and orientation of the product in a flume washer is not well controlled, making positive contact by the sprays on all surfaces uncertain and sporadic. Brush washers traditionally control product movement with greater accuracy, but the brushes themselves are inherently a sanitation issue. Dirt, foreign material, and organic matter often becomes packed or wedged between the brush bristles, providing a natural growth medium for bacteria. This cohesive mixture hardens with time, is difficult to remove, and forms a barrier to chemical treatment, eventually resulting in expensive maintenance or replacement.

Antimicrobial agents, such as chlorine, ozone, chorine dioxide, peroxyacetic acid, and peroxide are added to wash water to reduce bacteria population on the product and to control bacterial growth in the wash water and on equipment surfaces. To achieve maximum effectiveness and elimination of pathogens, product must be exposed to the sanitizing solution for a given amount of time. A direct correlation exists between bacteria reduction and exposure time. Unfortunately, however, there is no precise means to control exposure time or to ensure uniform coverage of all product surfaces with brush and flume washers, making it difficult to ensure that minimum exposure times have been met. Therefore, a thorough and reliable washing process is a critical part of ensuring fresh-cut ready-to-eat fruits and vegetables are safe for the consumer.

Therefore, there is a need for a method and apparatus for washing fruits and vegetables that float with precise control of exposure time to the cleaning solution, and with precise product movement to ensure complete solution exposure to all product surfaces.

SUMMARY OF THE INVENTION

One embodiment of the present invention includes an apparatus for washing a product with a fluid. The apparatus may include a tank a first end and a second end and configured to contain the fluid at a predetermined height. The tank may receive a plurality of product into the fluid and be configured to receive a moving conveyor, having a first end, a second end, a first section, and a second section. The first section and the first end of the conveyor may be substantially submerged in the fluid in the tank with the first end of the conveyor being substantially adjacent to the first end of the tank. Further, the conveyor may have a plurality of protruding panels being structured and arranged on the first section to push the product through the fluid in the tank and being structured and arranged on the second section to lift the product from the fluid in the tank to the second end of the conveyor. At least one first nozzle may be positioned substantially above the first section of the conveyor and configured to deliver the fluid onto the product as the product is pushed by the plurality of panels. The fluid delivered from the at least one first nozzle may rotate the product in the fluid in the tank.

In another embodiment of the present invention, a method of washing a product in a fluid includes the steps of introducing a plurality of the product into the fluid at a first position in a tank and pushing the plurality of product from the first position to a second position using a plurality of protruding panels connected to a moving conveyor. The first and second position may be substantially located in the fluid in the tank. The method may also include the steps of rotating each of the plurality of product by delivering the fluid onto each of the plurality of product from at least one first nozzle positioned between the first position and the second position and lifting the plurality of product from the second position to a third position where the third position is removed from the fluid in the tank.

These and other objects and advantages of the invention will be apparent from the following description, the accompanying drawings and the appended claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

Figure 1:
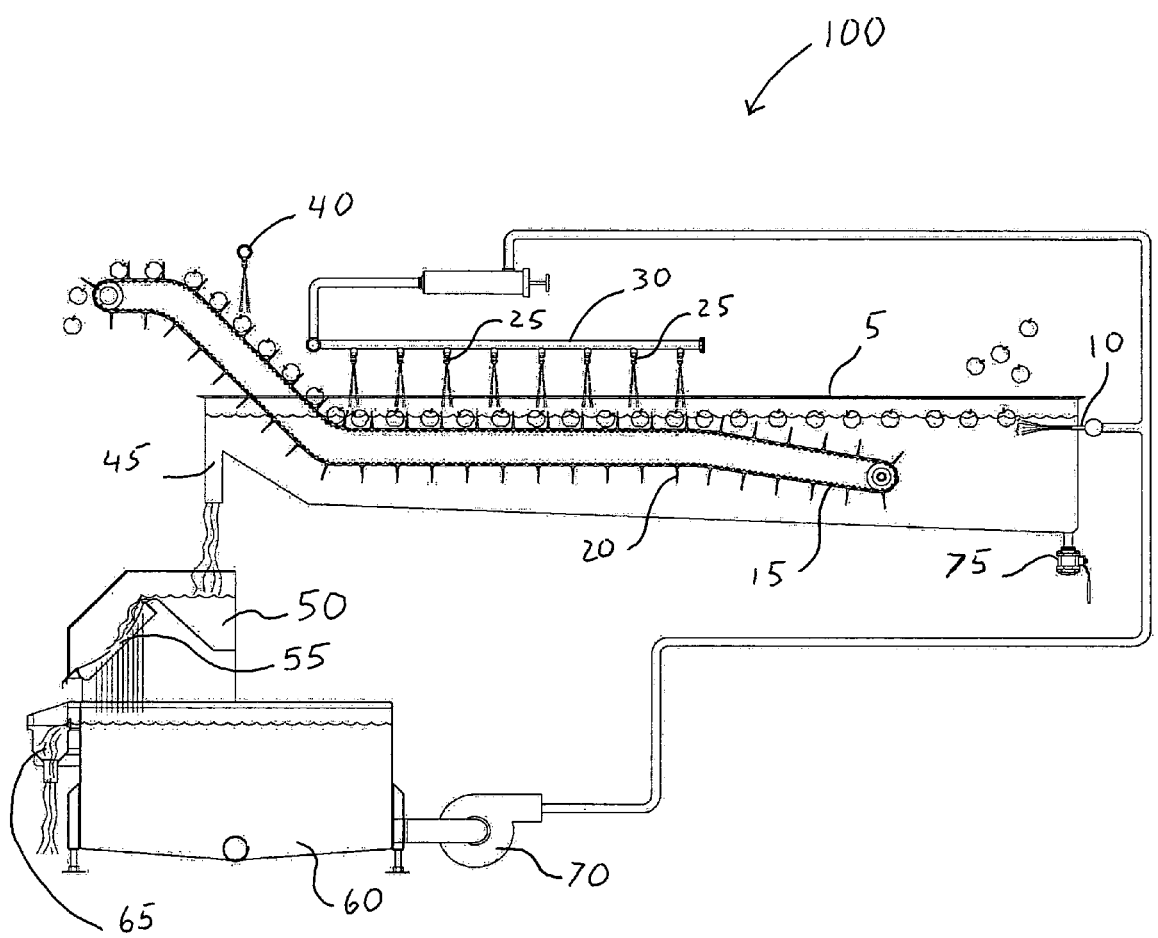
FIG. 1 is a side view of an apparatus for washing a product according to one embodiment of the present invention.

The present disclosure will now be described more fully with reference to the Figs. in which various embodiments of the present invention are shown. The subject matter of this disclosure may, however, be embodied in many different forms and should not be construed as being limited to the embodiments set forth herein.

One embodiment of the present invention includes an apparatus for providing a positive means of removing soil, foreign matter, and bacteria from the surface of whole fruit and vegetables, particularly those that float or have neutral bouyancy. It is contemplated that elements, such as paddles, on a submerged conveyor belt may transport product through an array of spray nozzles. Fan shaped sprays may be aligned to form continuous transverse sheets of water, or other fluids, such that the sheets of water or other fluids impart a controlled rotating or spinning motion on the fruit.

In order to counteract the backward force of the sheets of water, the conveyor belt and the attached paddles or panels may be configured to push the floating product through the sprays. The spinning action of the fruit or vegetable ensures that the entire surface of the product is exposed water and cleaning solution. The spinning action also creates a relative velocity between the surfaces of the product and the water in which it is submerged, creating a scouring action on the surface of the product.

According to one embodiment of the present invention, the apparatus may include a plurality of nozzles creating a plurality of continuous sheets of water for the fruit to pass through, providing a thorough cleaning. After exiting the sprays, the conveyor belt may be configured to angle upward in order to carry the product out of the water bath. It is contemplated that an additional set of fresh water sprays may be used to rinse any cleaning solution and remaining residue that may be on the product. The final spray of fresh water may also function to continuously replenish the water in the bath with clean water.

According to one embodiment of the present invention, the washing apparatus may achieve an effective wash by utilizing the solvent property of water to loosen and dissolve soil and foreign matter and by utilizing the impact from the sprays to physically loosen additional soil and contaminants adhering to the product. Additionally, the flow of water from the sprays into the bath may carry contaminants and bacteria away from the product body while chemical biocides and other cleaning solutions known to those of skill in the art may kill any bacteria remaining on the surface of the fruit or vegetable.

Contrary to the traditional cleaning methods, the present invention includes the use of a submerged conveyor with paddles to control movement of product through the array of sprays. Furthermore, the present invention uses high impact sprays to rotate and scour the product surface. It should be noted that, without the forward movement and force of the conveyor and submerged paddles, the impact force from the sprays used to rotate the product may be sufficient to halt forward movement of the product.

Referring to FIG. 1, a side view of a washing apparatus 100 according to an embodiment of the present invention is shown. The apparatus 100 includes a water tank 5 into which products, including fruits and vegetables and other products, may be continuously loaded. As shown in FIG. 1 and used for illustrative purposes, apples are shown being continuously loaded into the tank 5 to be washed. Once in the water of the tank 5, the apples may be propelled forward by jets of water discharging from nozzles 10 positioned across the rear wall of the tank 5. Although only one nozzle 10 is shown in the side view of FIG. 1, it would be apparent to those of skill in the art that various numbers of nozzles 10 may be used to adequately move and direct the apples away from the rear wall of the tank 5 as shown. Quick displacement of apples by the nozzles 10 reduces the possibility of collisions between apples being loaded and apples that are already floating in the water of the tank 5.

Within the tank 5, the apples may be directed by the water current from the nozzles 10 toward and onto a submerged horizontal conveyor 15 having full width paddles 20 at substantially regular intervals. In one embodiment, the height of paddles 20 may be approximately 1.5 times the expected diameter of product to be washed with the water level of the tank 5 maintained slightly above top of paddles 20.

As shown in FIG. 1, the paddles 20 may be configured to push the floating apples forward into a series of transverse fan sprays created by an array of nozzles 25. The array of nozzles 25 may be located on header system 30 mounted over tank 5. As discussed above, the array of nozzles may generate a continuous sheet of water delivered substantially downward from the arrays of nozzles 25. Upon impact with the apples or product, the sprays may cause the floating apples to rotate.

Figure 2:
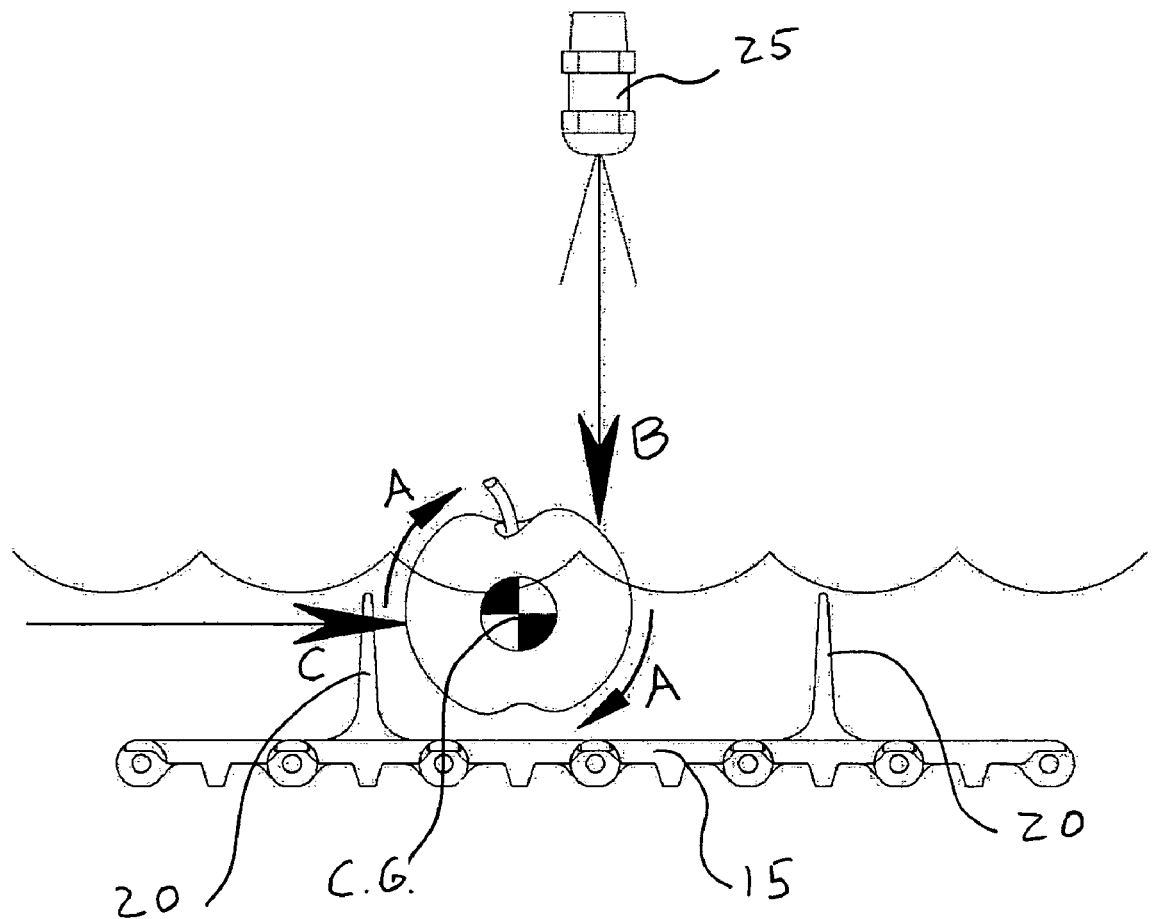
FIG. 2 is a side view of a portion of the apparatus shown in FIG. 1 according to one embodiment of the present invention.

Referring to FIG. 2, the apples may usually first rotate forward in a clockwise direction, as shown by the arrows A, about their center of gravity (shown as C.G. in FIG. 2) when the apple comes in contact with the spray directed in the direction of arrow B. The paddles 20, moving in the direction of arrow C, may be used to force the apples into the line of spray. As a result of the forward movement of the paddle 20, the line of spray shown as arrow B will eventually move across the center of gravity, causing the apple to rotate backward in a counterclockwise direction. However, it should be understood that the rotation direction may be reversed or changed without deviating from the scope and spirit of the present invention.

Referring again to FIG. 1, the apparatus 100 is shown with five sets of arrays of nozzles 25. Each array of nozzles 25 causing this rotating action described with reference to FIG. 2. AS a result, the apparatus 100 may generate significant scouring action between the movement and rotation of the apple and the water in the tank 5. However, it should be understood that different types of arrangement and different numbers of nozzles 25 may be used without deviating from the scope and spirit of the present invention.

After passing under the arrays of nozzles 25, the apples may be carried or lifted out of the water of the tank 5 by the change in direction of the conveyor 15. Alternatively, a separate conveyor or other apparatus may be used to remove the apples from the tank. As shown in FIG. 1, the conveyor 15 may incline upward after leaving washing zone and the nozzles 25, lifting the apples out of tank 5. The paddles 20 may also be used to prevent the apples from rolling back down the conveyor 15 and into the tank 5. Furthermore, the paddles 20 may be employed to force the apples into a freshwater spray from a final array of nozzles 40. The freshwater spray may be used to rinse washer residue from the apples. It is also contemplated that the freshwater spray may continuously replenish the apparatus 100 with clean water. It should be noted however, that is a solution may be diluted by the addition of the fresh water from the nozzles 40.

Upon reaching the end of the conveyor 15, the apples may be collected or carried away on additional conveyors (not shown) or other apparatuses according to convention means known in the art.

As shown in FIG. 1, the water supplied to tank from nozzles 10, 25, and 40 may exit the tank 5 at the overflow passage 45. Water passing through the overflow passage 45 may initially collect in the first reservoir 50. Water overflowing the first reservoir 50 may passes through a sieve 55, allowing solid contaminants to be separated from the water. A second reservoir 60 may be configured to collect the water that is ready to be recycled through the system.

Excess water supplied to system through freshwater spray may exit the system through an overflow port 65 located in the second reservoir 60. A circulating pump 70 may be used to pump pressurized water back to the nozzles 10 and 25. As would be apparent to one of ordinary skill, the pump 70 may be sized and configured to produce the pressure needed to discharge water from the nozzles 10 and 25 at the desired velocity. Sand, sediment and other debris washed off the apples may settle in the bottom of the tank 5 or flow out of the tank through the overflow passage 45. To aid in removing debris from the bottom of the tank 5, a drain valve 75 may be configured to release a large flow of water through the drain valve 75 for a short increment of time.

Figure 3:
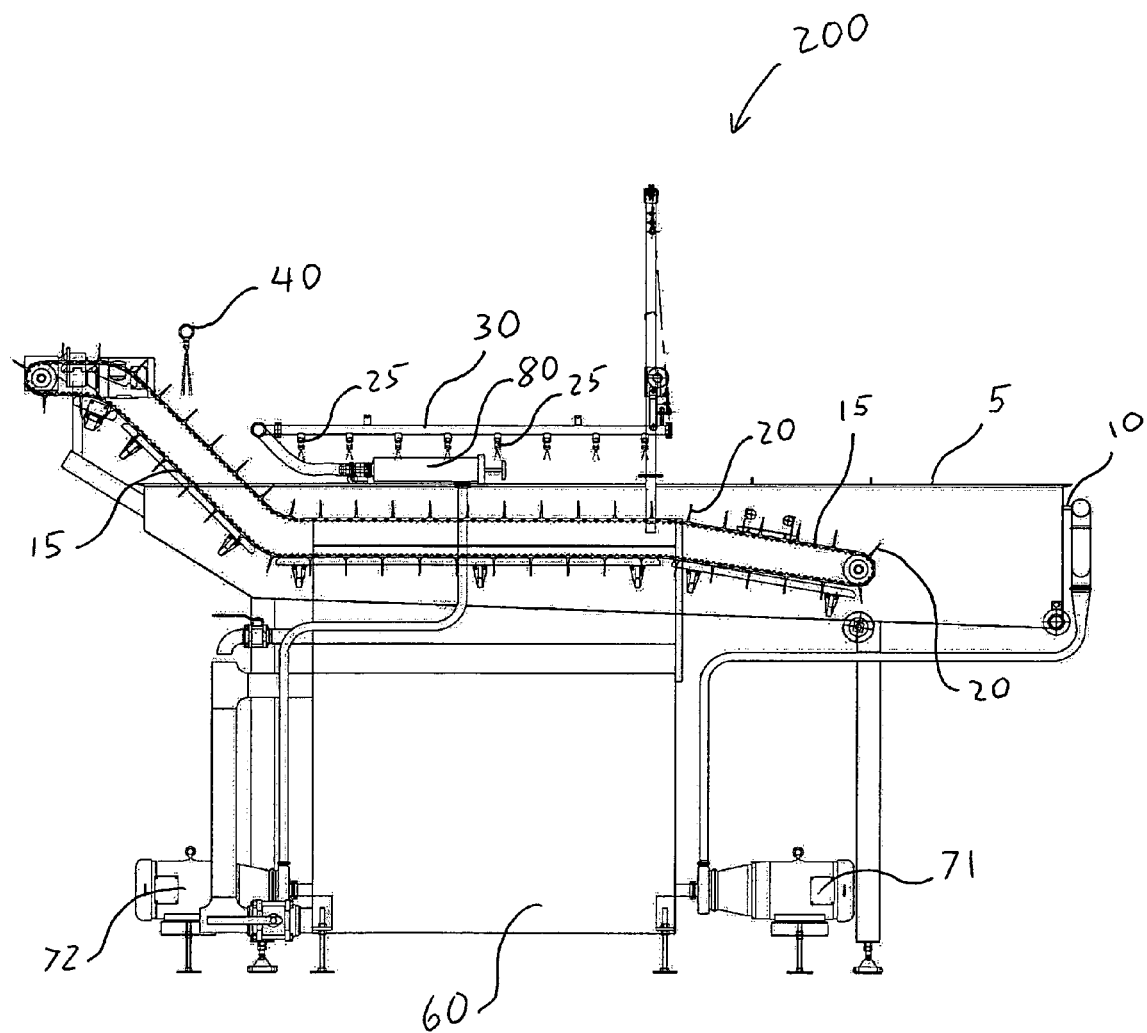
FIG. 3 is a side view of another apparatus for washing a product according to an another embodiment of the present invention.
Figure 4:
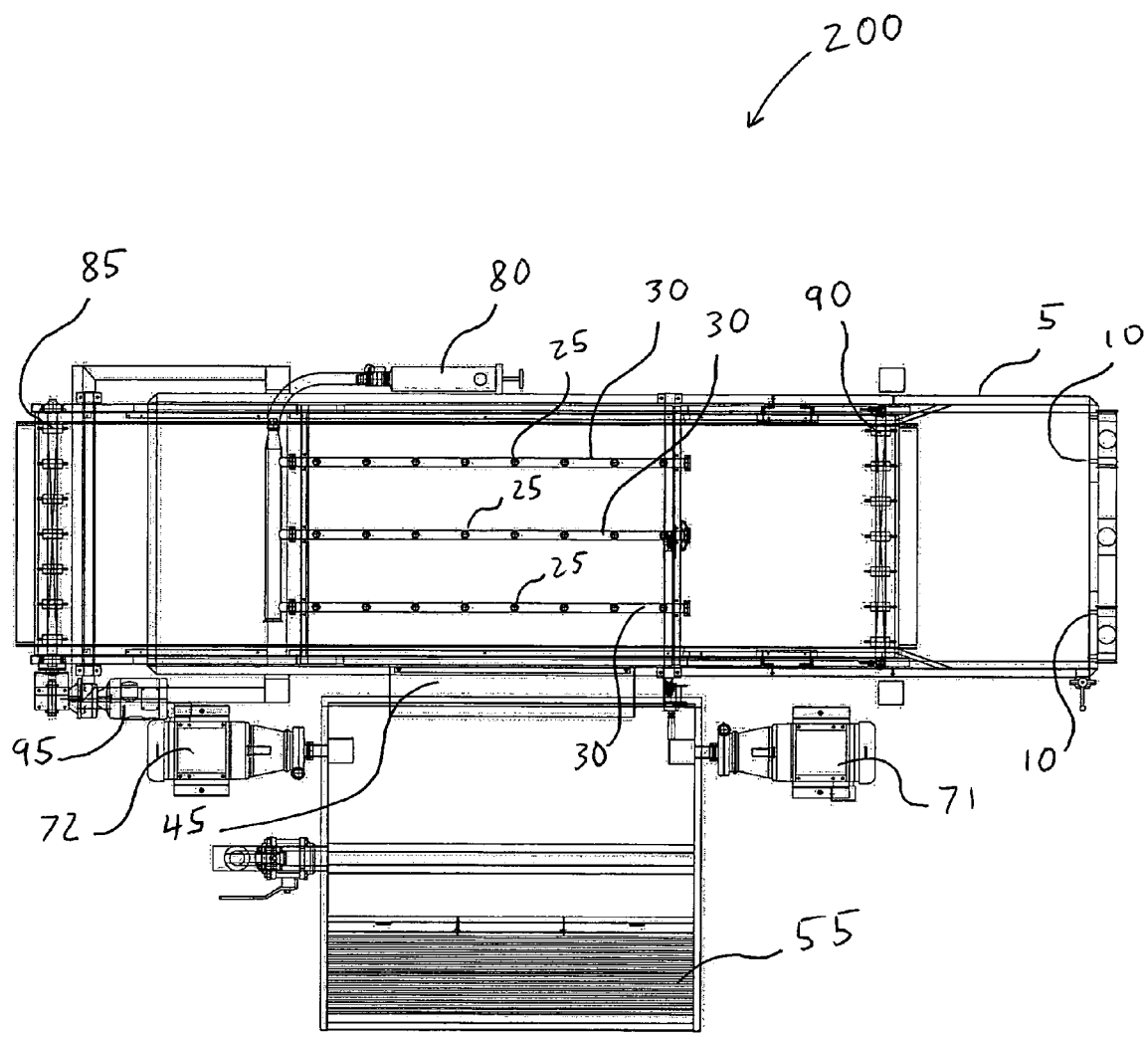
FIG. 4 is a top view of the apparatus of FIG. 3.

Referring to FIGS. 3 and 4, another embodiment 200 of the washing apparatus is shown in accordance with the present invention. As shown, the conveyor 15 includes multiple sections are varying angles of inclination. More particularly, the section of the conveyor nearest the nozzle 10 is angles downward and may allow the conveyor 15 to more easily load and gather product onto the conveyor 15 between the paddles 20. The washing zone of the conveyor 15 is shown on the horizontal plane and positioned beneath the nozzles 25. Finally, upon leaving the washing zone, the conveyor 15 angles upward to carry or lift the washed product out of the tank 5, where the conveyor 15 levels off for a short distance. It should be understood that the configuration of the conveyor, including the length, width, and angle, may be changed without deviating from the scope and spirit of the present invention.

As shown in the embodiment of FIGS. 3 and 4, the washing apparatus includes multiple pumps 71 and 72 and also includes a filter 80 between the pump 72 and the nozzles 25. The pump 72 may be associated with the nozzles 25 and sized and configured to produce pressurized water at the desired pressure and volume flow. Likewise, the pump 71 may be associated with nozzle 10 and may be configured to supply pressurized water to the nozzle 10 at a desired pressure. Alternative embodiments and pump configurations may be considered and implemented without deviation from the present invention.

Referring to FIG. 4, a top view of the washing apparatus 200 is shown without the conveyor in order to display the drive pulleys 85 and 90. The pulleys and the conveyor may be driven by a motor 95, which may be sized and configured to move and lift the product through the tank 5 and out of the water after washing has occurred. It would be apparent to those of skill in the art that the conveyor 15, drive pulleys 85 and 90, and the drive motor 95 may be implemented in many different ways and the figures and descriptions should not be considered limiting on the scope of the present invention.

It should be noted that the recirculating water system may be employed as shown in the embodiments of the present invention with water and other cleaning solutions. However, other fluids of varying consistencies and viscosities may be used in accordance with the scope and spirit of the present invention. Likewise, as shown in FIG. 4, the header system 30 includes three pipes distributing water to the nozzles 25. However, the header system 30 and the number and placement of nozzles 25 may be changed without deviating from the scope and spirit of the present invention.

With reference to FIGS. 1-4, the embodiments of the present invention have been discussed with reference to water as the cleaning solution employed. However, it would be apparent to one of skill in the art that other fluids, include solutions containing biocides and other cleaning solutions, may be used. It should be noted that the use of chemical solutions in the tank and the fluid recirculation may be diluted over time by the introduction of fresh water from the nozzles 40. As such, it is contemplated that the fresh water used for rinsing the product after emerging from the tank, may be diverted from being collected by the tank. As such, the fresh water from nozzles 40 may not dilute the solution in the tank 5 and the reservoirs 50 and 60.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. An apparatus for washing a floating product having a diameter, the apparatus comprising:

a tank having a first end and a second end, the tank configured to contain a fluid at a predetermined level and to receive a plurality of product into the fluid, the product being floatable in the tank;

at least one second nozzle positioned at the first end of the tank, the at least one second nozzle submerged and configured to direct the product toward a moving conveyor;

the moving conveyor having a plurality of protruding paddles, each of said paddles having a top, the conveyor further having a first section, a second section, a third section, and a fourth section, each section having a first end and a second end, wherein:

the first section is substantially adjacent to the first end of the tank and substantially submerged in the fluid in the tank in an inclined position, wherein the first end of the first section is proximal to the second nozzle and the second end of the first section is distal to the second nozzle, wherein the distance between the top of the paddles and the fluid level in the tank is bigger than a diameter of the floating product at the first end of the first section and is smaller than a diameter of the floating product at the second end of the first section, the second section is substantially submerged in the tank in a substantially horizontal position, wherein the distance between the top of the paddles and the fluid level in the tank is less than a diameter of the floating product, the third section is inclined, wherein the first end of the third section is substantially submerged while the second end of the third section is above the fluid level, the fourth section is positioned above the fluid level, wherein the second end of the fourth section extends beyond the second end of the tank;

at least one first nozzle positioned substantially above the second section of the conveyor and configured to deliver the fluid onto the floating product as the floating product is pushed by the plurality of paddles; wherein the fluid delivered from the at least one first nozzle rotates the floating product in the fluid in the tank.

2. The apparatus according to claim 1, further comprising at least one third nozzle positioned substantially above the third section of the conveyor and configured to deliver fresh fluid to the product as the product is lifted toward the fourth section of the conveyor.

3. The apparatus according to claim 2, further comprising:
an overflow passage connected to the tank; and
a reservoir configured to receive the fluid from the overflow passage.

4. The apparatus according to claim 3, further comprising at least one of a filter and a sieve positioned between the overflow passage and the reservoir.

5. The apparatus according to claim 3, further comprising at least one pump configured to deliver the fluid to the at least one first nozzle and the at least one second nozzle.

6. The apparatus according to claim 5, further comprising a filter positioned between the at least one pump and at least one of the at least one first nozzle and the at least one second nozzle.

7. The apparatus according to claim 1, wherein the height of the paddles is approximately 1.5 times the diameter of the floating product.

8. The apparatus according to claim 1, wherein the fluid level in the tank is maintained slightly above the top of the paddles in said second section of said moving conveyor.

* * * * *